Sept. 25, 1962 F. ULRICH 3,056,045

ELECTRONIC SWITCHING UNIT FOR THE CONSTRUCTION OF INFORMATION STORAGE DEVICES, COUNTERS AND THE LIKE

Filed Nov. 24, 1958 6 Sheets-Sheet 1

INVENTOR.
F. Ulrich
BY
Albert Kiess
Attorney

Sept. 25, 1962 F. ULRICH 3,056,045

ELECTRONIC SWITCHING UNIT FOR THE CONSTRUCTION OF INFORMATION STORAGE DEVICES, COUNTERS AND THE LIKE

Filed Nov. 24, 1958

6 Sheets-Sheet 2

INVENTOR.
F. Ulrich
BY Albert Perro
Attorney

Sept. 25, 1962 F. ULRICH 3,056,045

ELECTRONIC SWITCHING UNIT FOR THE CONSTRUCTION OF INFORMATION STORAGE DEVICES, COUNTERS AND THE LIKE

Filed Nov. 24, 1958

6 Sheets-Sheet 3

INVENTOR
F. ULRICH

Sept. 25, 1962 F. ULRICH 3,056,045

ELECTRONIC SWITCHING UNIT FOR THE CONSTRUCTION OF INFORMATION STORAGE DEVICES, COUNTERS AND THE LIKE

Filed Nov. 24, 1958

6 Sheets-Sheet 4

F. Ulrich INVENTOR.

BY Albert Reis
Attorney

F. Ulrich INVENTOR.
BY Albert Ross
Attorney

Sept. 25, 1962 F. ULRICH 3,056,045

ELECTRONIC SWITCHING UNIT FOR THE CONSTRUCTION OF INFORMATION STORAGE DEVICES, COUNTERS AND THE LIKE

Filed Nov. 24, 1958

6 Sheets-Sheet 6

INVENTOR.

F. Ulrich

BY Albert Reiss

Attorney

United States Patent Office 3,056,045
Patented Sept. 25, 1962

3,056,045

ELECTRONIC SWITCHING UNIT FOR THE CONSTRUCTION OF INFORMATION STORAGE DEVICES, COUNTERS AND THE LIKE

Friedrich Ulrich, Neustadt, Kreis Waiblingen, Germany, assignor to International Standard Electric Corporation, New York, N.Y., a corporation of Delaware Filed Nov. 24, 1958, Ser. No. 776,097
4 Claims. (Cl. 307—88.5)

Figure 1:
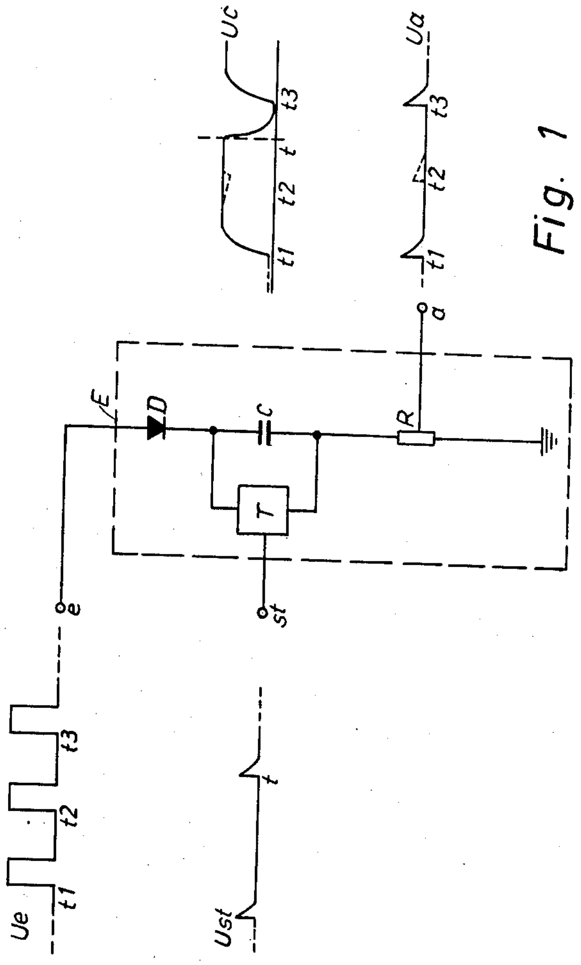

This invention relates to an electronic switching unit for the construction of functional groups in data processing systems. These functional groups include counting chains, shift registers, selectors, and the like and provide for the storing, transmitting and distributing of binary informations.

The binary information is represented in electronic systems as the condition of a structural element or as a predetermined operating condition of a group of structural elements. In the case of elements having hysteresis properties, two operating conditions may be represented by the elements being in one or the other of their points of remanence. In the case of structural elements having a nonlinear characteristic, two operating conditions may be generated by providing circuit arrangements which are capable of assuming two different stable operating conditions. As a rule, in such types of circuit arrangements, the nonlinear switching element is either blocked or unblocked to represent two operating conditions. These circuits have the disadvantage that when the element is in an unblocked condition it is necessary to maintain a relatively high steady current which, in many cases, has an unfavorable effect upon the service life of some switching elements. This disadvantage of a relative high power input requirement may be avoided to some extent by employing structural elements having hysteresis properties. However, these latter elements require considerable preceding amplifying equipment and the cost of functional groups containing these elements becomes prohibitive.

Other known circuit arrangements employ condensers in which the charging current is utilized for controlling the permeability of gating circuits. However, the power input of such circuits is high and the output is low.

In accordance with the present invention, the foregoing disadvantages have been overcome by providing an electronic switching unit which requires only a small steady current. This switching unit is characterized by a capacitor-transistor parallel arrangement connected in series with a linear switching element and a load resistor.

External connections to the switching unit includes an input lead associated wtih the linear switching element, a control lead associated with the parallel condenser-transistor arrangement, and an output lead associated with the lead resistor. The noted leads are selectively controlled so that control pulses appearing on this control lead, block or unblock the linear switching element to prohibit or permit, input voltage pulse signals appearing on the input lead to pass to the output lead. The signals on the output lead indicate the respective charge variation of the condenser. Accordingly, in the most simple case, this switching unit comprises one discharge circuit with one variable switching element. As a nonlinear switching element, it is appropriate to provide a transistor having its emitter and collector, connected in parallel with the condenser and its base electrode connected to the control lead.

A switching unit of this type is operated, in accordance with the invention, by input pulses and control pulses. First of all, it may be assumed that the condenser is in a fully charged condition as a result of a single input pulse, provided that the transistor is blocked. Due to the charging of the condenser, the operating circuit of the transistor will remain blocked to all further input pulses. If now, during the interval between two input pulses, the transistor is momentarily unblocked by the action of a control pulse, the condenser will be discharged and the switching unit is in condition for the passage of the next successive input pulse to the output lead.

When in this prepared condition, the switching unit is suitable for being employed as a channel selector or pulse distributor in any of a number of various functional groups. In view of the fact that the transistor is unblocked only momentarily, its power consumption is low. This power input can be limited even further by correspondingly dimensioning the condenser.

In the case of a blocking of the switching unit by the charging of the condenser, the subsequent input pulses replace the losses resulting from poor insulation and blocking resistance. However, the power consumption to overcome losses is also low.

A further embodiment of the invention relates to the employment of the switching unit with logical networks. To this end, a single switching unit is made up of several parallel-arranged discharge circuits each comprising one grid or base controlled switching element. Alternately, a discharge circuit comprising several series-connected controllable switching elements could be employed.

Figure 2:
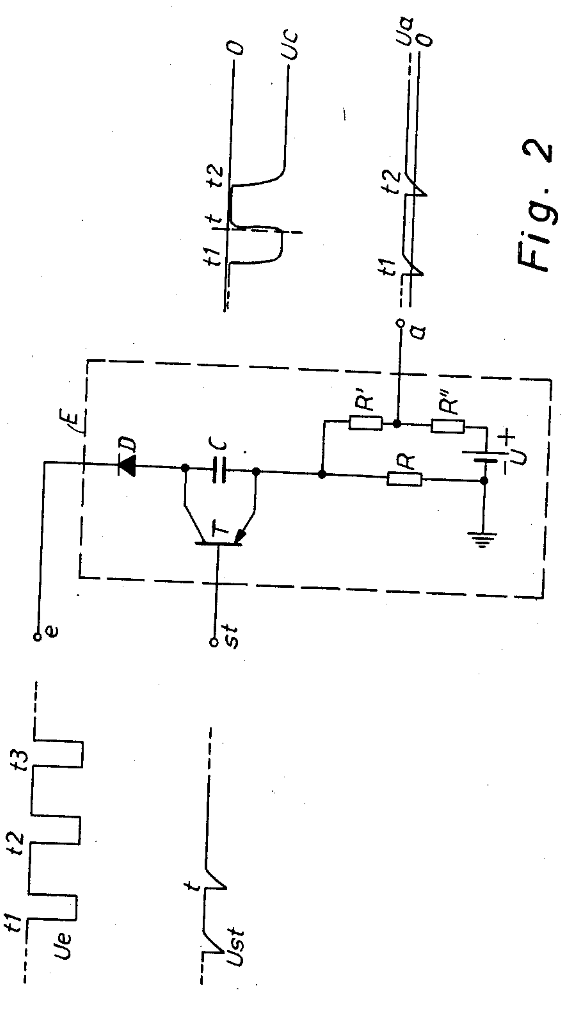
Figure 3:
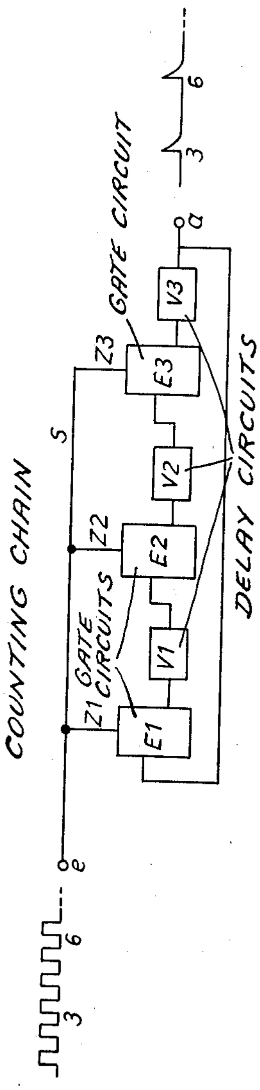
Figure 4:
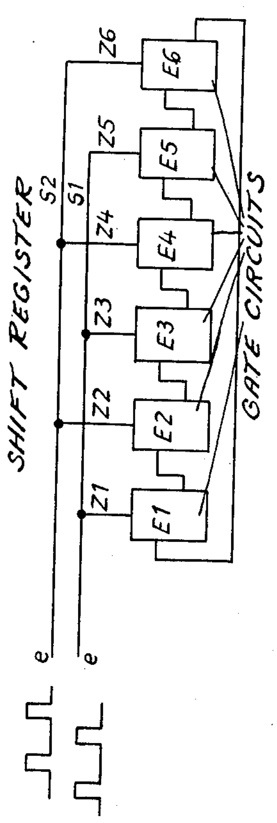
Figure 5:
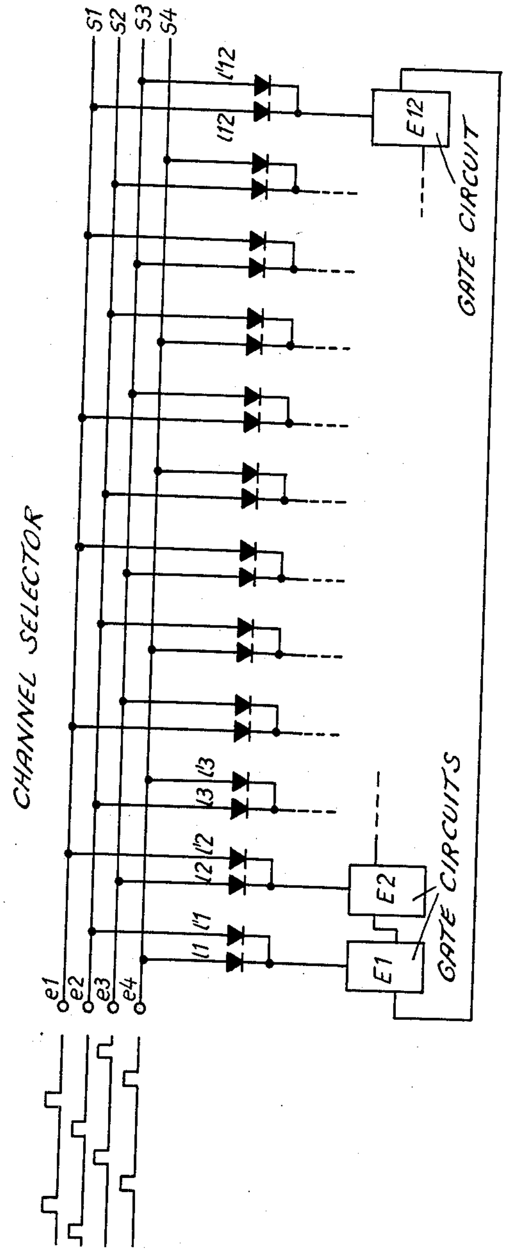
Figure 6:
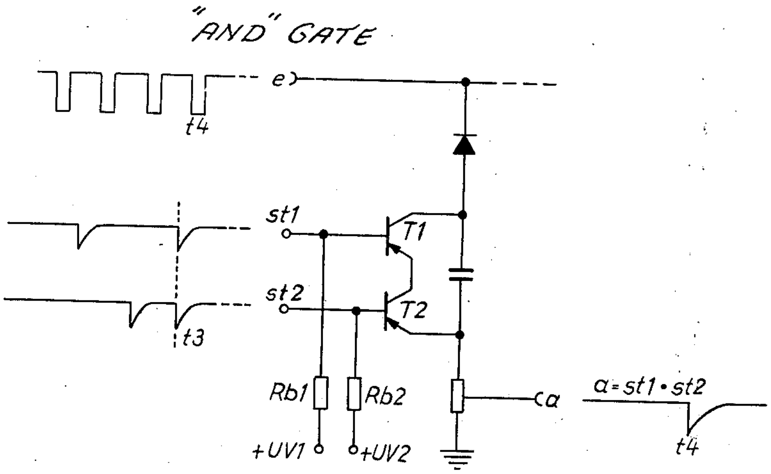
Figure 7:
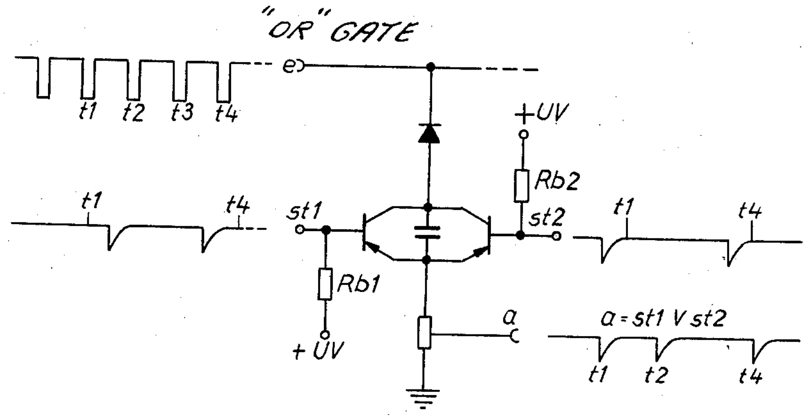

Further details and particulars of the invention as well as various examples of embodiments relating to the construction of functional groups will now be described with reference to the accompanying drawings in which:

FIG. 1 shows the basic circuit diagram of a switching unit according to the invention, FIG. 2 shows a transistorized switching unit, FIG. 3 shows a counting chain comprising three counting stages, FIG. 4 shows a counting chain or shift register, FIG. 5 shows a channel selector, FIG. 6 shows an AND-circuit, and FIG. 7 shows an OR-circuit.

The basic construction of switching unit E according to the invention is shown in FIG. 1, wherein condenser C is connected in parallel with a controllable switching element T. The condenser is connected in series with resistor R and diode D which is connected to input *e*. Control pulses are fed to the switching element T over a control lead *st*, and for the duration of these control pulses, the switching element is unblocked. Operating resistor R is provided with an output lead *a* for the output signals.

The switching unit is operated when voltage pulses U*e* are applied to the input *e*, at the same time that pulses U*st* are applied to the control lead *st*. When a control pulse appears on lead *st*, the switching element T is unblocked, and condenser C discharges. If at time-position *t*1, an input pulse appears on lead *e*, condenser C charges. It is provided that the pulse duration of U*e* is greater than the RC time constant of the operating circuit and after the termination of the input pulse, the condenser voltage Uc remains as shown by curve Uc. There is a partial discharge across the insulation resistance and across the blocking resistance of the switching element. This discharge is indicated by the dashlined curve Uc in FIG. 1.

Concurrently with the first input pulse, at the time-position *t*1, there appears at point *a*, an output signal U*a* which dies away when the condenser is charged. The second pulse appearance at time position *t*2 serves to compensate the voltage losses appearing across the condenser C. Accordingly, there will now appear at point *a* a noise signal as indicated by the dashlines.

When a second control pulse appears on lead *st* at time-position *t*2, condenser C discharges, as indicated by curve U*c*. As a result of the appearance of the third input pulse, condenser C recharges and a further output signal U*a* appears at the time-position *t*3 on lead *a*.

It is necessary that a sufficient phase shift exists between the input pulses and the control pulses since only the input pulse which follows a control pulse will be transmitted to the output line. Hence, when using the control lead as the input for information pulses and the lead-in conductors as the input for clock pulses or reading pulses, an output signal will only be transmitted after an information pulse had been applied to the switching unit.

An embodiment using a transistor as the switching element, is shown in FIG. 2 of the drawings. In the switching unit according to FIG. 2, transistor T is connected with its emitter and collector in parallel with the condenser C. With respect to the collector-side, this parallel arrangement of the condenser and transistor is connected with a lead-in conductor *e* for negative voltage pulses through a decoupling diode D. A voltage divider is connected to the direct-current voltage source U and comprises the resistors R, R′ and R″, one tap point of such network being connected to the emitter-side of the parallel-connection, and the other tap point being connected to the lead *a* for output signals. The base electrode of the transistor is connected to control lead *st*. This switching unit is operated in response to negative control-pulses being fed to the control lead. As shown in FIG. 2, the second control pulse appears between the first and the second input pulse, so that, as is indicated by the curve U*c*, the condenser will be discharged after the first input pulse, and recharged by the second input pulse.

The switching units as shown in FIGS. 1 and 2 may be assembled or combined in various arrangements to form functional groups. For instance, a counting chain may be constructed by employing the switching units of FIG. 3 in such a way that each counting stage is provided with one switching unit having a single lead-in conductor as well as a time-delay element connected to the switching unit at the tap point for the output signals. The connection is such that the input pulses are fed simultaneously to all stages over bus bars and that the output of the time-delay element of one stage is connected with the control lead of the switching unit of the next succeeding stage. In order to count, the condenser in one stage is discharged and the condensers in all other stages are charged, so that each input pulse will charge the discharged condenser and consequently, via a time-delay element, will initiate the discharge of the condenser of the next succeeding stage.

In the counting chain according to FIG. 3, three switching units E1, E2, and E3, and corresponding time-delay elements V1, V2, and V3 are connected together to form a ring-counting device. The bus bar S is connected with the input *e* for input pulses, and the third stage (E3, V3) is connected with the output *a*. If the condenser in E2 and E3 are charged, and the condenser in E1 is discharged, the first input pulse will effect the charging of the condenser in E1. This results in an output signal being fed through time-delay element V1 to the control lead of E2, so that the variable switching element in E2 will be unblocked and the condenser in E2 will be discharged. Upon arrival of the next succeeding input pulse, the condenser in E2 will be recharged and the condenser in E3 will be discharged, and so forth. Responsive to the charging of the condenser in E3, an output signal will be transmitted to output *a*. In the case of the three-stage ring counter, only every third input pulse will be transferred to the output.

For effecting a primary charging of the condenser of only one stage in the counting chain, it is necessary to avoid interaction between any one counting stage and the next. To accomplish this, the charging pulses are correspondingly limited in duration. For this reason, the counting chain is preferably designed in such a way that the charging of the condenser of all stages is carried out in a step-by-step manner with the aid of correspondingly dimensioned pulses, and that subsequently thereto, the discharge of the condenser of any one stage is capable of being initiated over an associated control lead.

If, in a multi-stage counter, the condensers are discharged in several switching units, the counter may be used as a shift register. In this case, the circuit arrangement is modified so that the control lead of the first stage is connected with the lead-in conductor for information pulses and the bus bar is connected with the lead-in conductor for the transfer pulses.

A counting device of this type is also suitable for the selective switching of input pulses from a common pulse source to a plurality of lines which are to be read in a cyclical manner. Thus, for instance, the lead-in conductors Z1, Z2, and Z3 of the counting chain according to FIG. 3, may be the line or column wires of a ferrite-core storage matrix, and may be successively energized by the input pulses U*e* to effect the cyclical writing-in or reading-out.

When counting chains are employed for selective switching, the operation depends on the distribution of the input pulse over various operating circuits, while the output signals, which are capable of being read at the output of the switching units, are without any special importance. In such a case, no time-delay elements are necessary, and the counting chain may be arranged so that each stage contains one switching unit with one lead-in conductor. However, the switching units must be arranged in such a way that the input pulses are capable of being alternatively fed over two bus bars, as may be seen in FIG. 4. This arrangement is such that the lead-in conductors of all odd-numbered stages are connected with one bus bar and the lead-in conductor of even-numbered stages are connected with the other bus bar. In FIG. 4, the bus bars are designated by S1 and S2, and the tap point for output signals of one stage are connected to the control lead of the next succeeding stage. This type of counting chain is operated in such a way that the condenser is discharged in one stage, while the condensers of all other stages are charged. In FIG. 4, the stages E1 through E6 are connected with the lead-in conductors Z1 through Z6 and with the bus bars S1 and S2 to form an annular type of counting device. If, initially, the condenser in E1 is discharged and the condensers in E2 through E6 are charged, and if commencing with the first input pulse to S1, the input pulses are alternately applied over busses S1 and S2, the pulses are distributed one-at-a-time in turn to the lead-in conductors Z1 through Z6.

A counting chain of this type may now also be subjected to a multiple utilization as shown in FIG. 5 wherein each counting stage is connected with a plurality of lead-in conductors which are connected with different bus bars. This arrangement comprises a pulse distributor having four inputs *e*1 through *e*4, and four bus bars S1 through S4, as well as two lead-in conductors L or L′ per counting stage. If simultaneously several lead-in conductors L or respectively L′ are energized then the arrangement according to FIG. 5 will be operated so that the condenser in every second switching unit is discharged and the condenser in those intermediate switching units are charged. Then, simultaneously with a pulse on the lead-in conductor L*n*, the pulses on the lead-in conductors L ($n\pm4$), $n\pm8$ etc., or simultaneously on the lead-in conductors L′ ($n\pm2$), L′ ($n\pm6$), L′ ($n\pm10$) are switched. As a rule, the order of succession of the pulse distributing operations is dependent upon the chosen wiring between the lead-in conductors L*n* and the bus bars S. Accordingly, a pulse distributor according to another embodiment of the invention is constructed so that the reading lines are in groups connected with the lead-in conductors of the switching units and, in groups with one of a plurality of bus bars. In this arrangement, the input pulses are applied to these bus bars in a predetermined order of sequence.

In addition to the employment of the described types of switching units for the construction of storage devices, counting chains, and shift registers, as well as the employment as pulse distributors, the construction of logical networks is of a particular importance. According to a still further embodiment of the invention, switching units comprising several settable or variable switching elements for representing the functions AND and OR are described as a result of their small current requirements, as well as due to their practically unlimited output.

In FIG. 6 of the drawings there is shown an AND gate. In this circuit, a series-arrangement of transistors T1 and T2 is connected in parallel to a condenser C. The base electrode of transistor T1 is connected to the control lead *st1* and the base electrode of transistor T2 is connected to control lead *st2*. A blocking potential UV1 or UV2 is fed to the control leads from resistors R*b*1 and R*b*2 so that the transistors are normally blocked. This AND-circuit is operated by negative reading pulses which are fed over the input *e*, and by negative control pulses. If initially, condenser C is discharged, it will be recharged by the first reading pulse over *e*, and the charging current produces a voltage drop across the operating resistor R. This voltage drop is taken off the tap point *a* as a negative output pulse. Upon recharging of the capacitor, the circuit is blocked to further reading pulses and no further output pulses will appear at *a*. If negative control pulses are applied to the control leads between following reading pulses, condenser C will be discharged each time a control pulse on *st1* coincides with a pulse on *st2*. In the example as shown in FIG. 6, such a coincidence will appear at the time-position *t3*. The condenser discharges and recharges after the termination of the control pulses. This is caused by the next succeeding reading pulse appearing at time-position *t4* and an output pulse appearing on the output at such time position.

Instead of using the charging current for indicating a coincidence of the control pulses, the discharge current may be utilized by the transistors T1 and T2. The indication will be effected at time-position *t3*, when the output signal is taken off the discharge circuit. Such a tap can be accomplished by inserting an ohmic or inductive resistance in the discharge circuit, and directly or transformatively coupling a tap thereto.

The switching unit designed as an OR-circuit is shown in FIG. 7. In this embodiment, two discharge circuits are assigned to condenser C. The discharge may be accomplished through the emitter-collector gap of either transistor T1 or transistor T2. Also, as in the preceding example, the control leads *st1* and *st2*, as well as resistors R*b*1 and R*b*2, connected to the blocking potential UV1 or UV2 are connected to respective base electrodes of transistors T1 and T2. The tap point *a* for the output pulses is connected to operating resistor R. The disclosed OR-circuit is operated by negative reading pulses and negative control pulses. Upon charging of the condenser, an output pulse is released by the reading pulses at the input *e* if a control pulse has unblocked one of the transistors and caused a discharge of the capacitor.

For reasons of clarity, the described examples have been restricted to AND or OR circuits comprising two input lines. From the presented basic principle, however, it may be easily recognized how more complicated types of logical circuits, such as "all of *n*" or "at least one of *n*" can be arranged.

The minimum requirement of energy on the control leads is one of the particular advantages of the above described circuits. In these cases, the entire output power is produced by the reading pulses. As previously mentioned small noise pulses appear as a result of unwanted condenser discharges. In the event the input power on the control leads is not critical, the noise pulses can be completely avoided by interchanging the control leads and reading lines. More specifically, the reading line is connected with the base electrode of the transistor and at least one of the control leads is connected to the condenser. Also, the tap point for the output pulses is connected to the discharge circuit.

Figure 8:
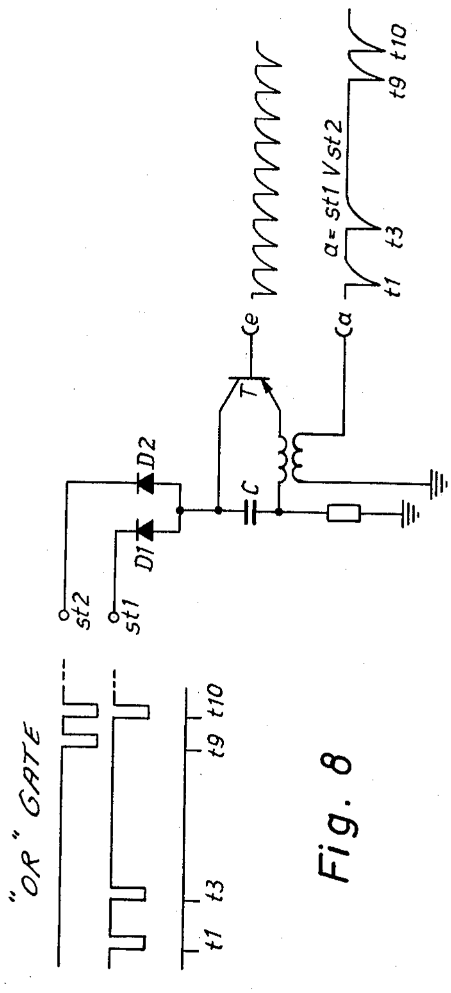

In FIG. 8 there is shown an OR-circuit in which the control leads *st1* and *st2* are connected via decoupling diodes D1 or D2 with condenser C, and the interrogation line *e* is connected with the base electrode of transistor T. The output *a* is inductively coupled to the discharge circuit. The OR-circuit is operated such that the condenser is normally discharged. An output pulse at tap point *a* will be triggered only by the next succeeding reading pulse at *e*, if the condenser has been charged either from *st1* or *st2* or by both of them.

Figure 9:
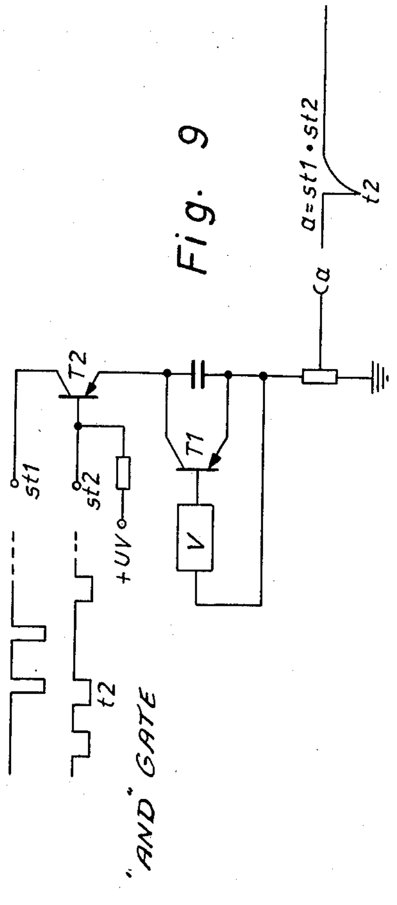

In FIG. 9 there is shown a suitable modification of the switching unit in the form of an AND-circuit. In this arrangement, a second transistor T2 is provided instead of the diode D having its collector electrode connected to control lead *st1*, and the base electrode connected to control lead *st2*. When input pulses on *st1* and *st2* appear coincidentally an output pulse will be transferred to output *a*. It may be of advantage to control the periodic discharge of the condenser by line *e*, which is connected to the base electrode of T1. Instead of periodically applying erase pulses or reading pulses, the output *a* may be coupled back to input *e* via a time-delay element, so that the arrangement, after having indicated a coincidence, will automatically be ready to operate again.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A static switch circuit comprising non-linear switch means, capacitative impedance means in shunt with said switch means, additional impedance means and uni-directional current carrying means in series with said switch means, means for first applying variable input signals to said capacitative impedance means through said uni-directional current carrying means to alter the state of the charge of said capacitative impedance means, means for thereafter applying a control signal to said switch means whereby to cause a change in the condition of said switch means and the return by said capacitative impedance means to its original state of charge, and output means coupled to said additional impedance means whereby there is obtained an output signal indicative of the change in the state of charge of said capacitative impedance means.

2. A static switch circuit as claimed in claim 1 wherein said non-linear switch means comprises a transistor having base, emitter and collector electrodes, with the said base electrode being connected to said means for applying said second potential.

3. A static switch as claimed in claim 2, wherein said collector electrode is coupled to said means for applying said input signals.

4. A counting chain employing switching units as set forth in claim 1 comprising a plurality of static switch circuits, each circuit comprising non-linear switch means, capacitative impedance means in shunt with said switch means, additional impedance means and uni-directional current carrying means in series, output means coupled to said additional impedance means, with said switch means, time delay means coupled to said output means, means for first applying a first potential to each of said capacitative means through respective of said uni-directional current carrying means, to alter the state of charge of each of said capacitative impedance means, and means for coupling the output of each circuit to the uni-directional current carrying means of the next succeeding circuit.

References Cited in the file of this patent

UNITED STATES PATENTS 2,492,018 Sunstein ---------------- Dec. 20, 1949

2,649,543 Trachenberg ------------ Aug. 18, 1953
2,729,812 Jahn -------------------- Jan. 3, 1956
2,923,837 Willett ----------------- Feb. 2, 1960

FOREIGN PATENTS 762,867 Great Britain ------------ Dec. 5, 1956